(12) United States Patent
Wang

(10) Patent No.: US 8,918,270 B2
(45) Date of Patent: Dec. 23, 2014

(54) WIRELESS TRAFFIC SENSOR SYSTEM

(76) Inventor: Tongqing Wang, Palo Alto, CA (US)

(*) Notice: Subject to any disclaimer, the term of this patent is extended or adjusted under 35 U.S.C. 154(b) by 680 days.

(21) Appl. No.: 13/317,610

(22) Filed: Oct. 24, 2011

(65) Prior Publication Data

US 2012/0105252 A1 May 3, 2012

Related U.S. Application Data

(60) Provisional application No. 61/455,995, filed on Oct. 28, 2010.

(51) Int. Cl.
*G08G 1/017* (2006.01)
*G08G 1/052* (2006.01)
*E01F 11/00* (2006.01)
*G08G 1/02* (2006.01)

(52) U.S. Cl.
CPC .............. *G08G 1/052* (2013.01); *G08G 1/017* (2013.01); *E01F 11/00* (2013.01); *G08G 1/02* (2013.01)
USPC .......................................... 701/119; 340/936

(58) Field of Classification Search
USPC ........................................................ 701/119
See application file for complete search history.

(56) References Cited

U.S. PATENT DOCUMENTS

| | | | | |
|---|---|---|---|---|
| 3,381,219 A | * | 4/1968 | Dumbeck | 324/178 |
| 3,544,958 A | * | 12/1970 | McIntire et al. | 340/936 |
| 4,031,510 A | * | 6/1977 | King | 340/936 |
| 5,317,311 A | * | 5/1994 | Martell et al. | 340/905 |
| 5,617,086 A | * | 4/1997 | Klashinsky et al. | 340/907 |
| 5,793,491 A | * | 8/1998 | Wangler et al. | 356/613 |
| 6,160,494 A | * | 12/2000 | Sodi et al. | 340/936 |
| 6,204,778 B1 | * | 3/2001 | Bergan et al. | 340/936 |
| 6,658,392 B2 | * | 12/2003 | Yoshida | 705/13 |
| 6,750,787 B2 | * | 6/2004 | Hutchinson | 340/942 |
| 7,075,427 B1 | * | 7/2006 | Pace et al. | 340/539.22 |
| 2002/0175831 A1 | * | 11/2002 | Bergan et al. | 340/908.1 |
| 2004/0239528 A1 | * | 12/2004 | Luscombe | 340/942 |
| 2007/0208506 A1 | * | 9/2007 | Macneille et al. | 701/209 |
| 2007/0276600 A1 | * | 11/2007 | King et al. | 701/301 |
| 2009/0146845 A1 | * | 6/2009 | Hedley | 340/936 |
| 2011/0013022 A1 | * | 1/2011 | Allen et al. | 348/149 |
| 2011/0095908 A1 | * | 4/2011 | Nadeem et al. | 340/905 |
| 2011/0224892 A1 | * | 9/2011 | Speiser | 701/118 |
| 2011/0298603 A1 | * | 12/2011 | King et al. | 340/436 |
| 2012/0105252 A1 | * | 5/2012 | Wang | 340/936 |

* cited by examiner

*Primary Examiner* — Shelly Chen

(57) ABSTRACT

Embodiments of the present invention provide a wireless traffic sensor system. The system includes a plurality of wireless traffic sensors collecting traffic information from one or more vehicles that pass by; and at least one wireless communication device that receives the traffic information from at least one of the wireless traffic sensors and relays the traffic information to a wireless communication tower in vicinity. At least one of the wireless traffic sensors is placed inside a container and has a mounting flange that lays over edge of the container and is affixed to the container by one or more spring clips. The spring clips are not physically accessible once the wireless traffic sensor is affixed to the container, and are released only upon receiving a coded wireless electromagnetic signal or by a special tool that matches to a key inside the wireless traffic sensor.

14 Claims, 8 Drawing Sheets

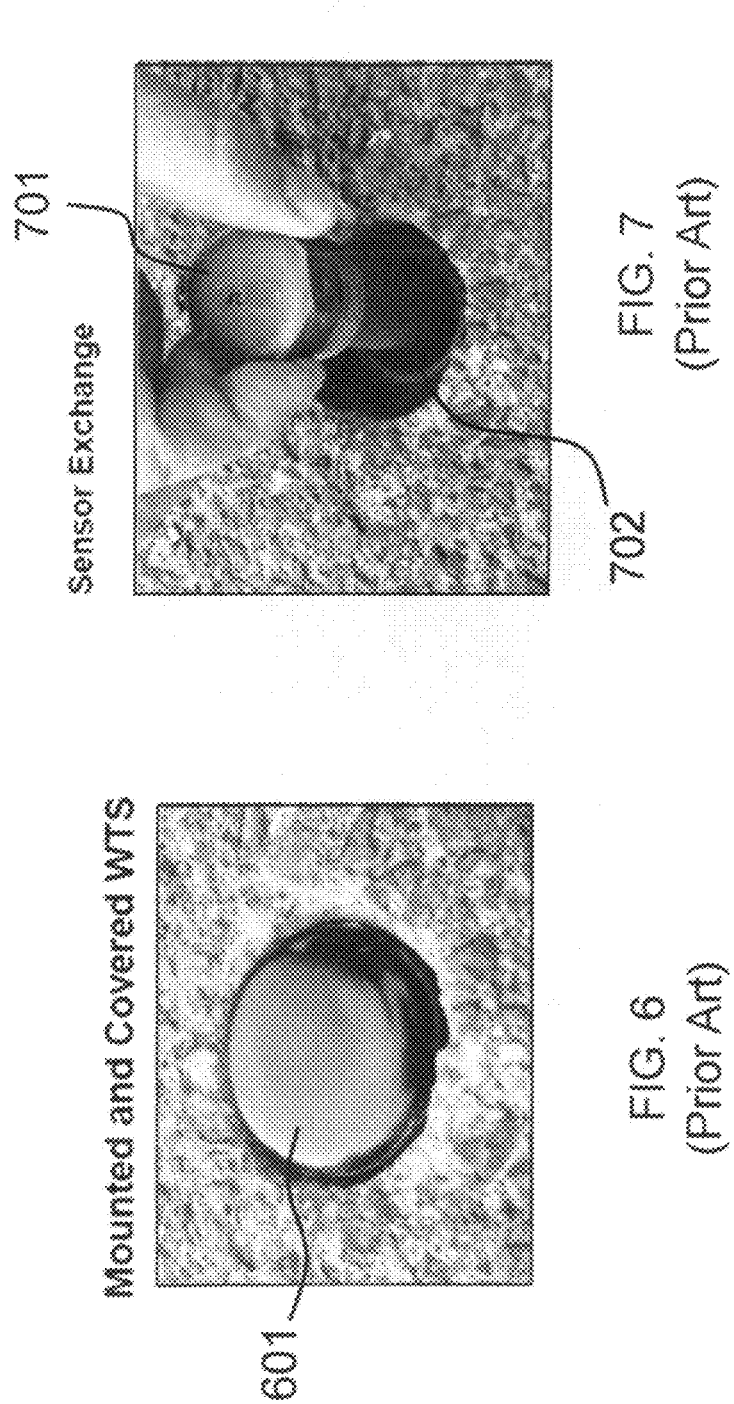

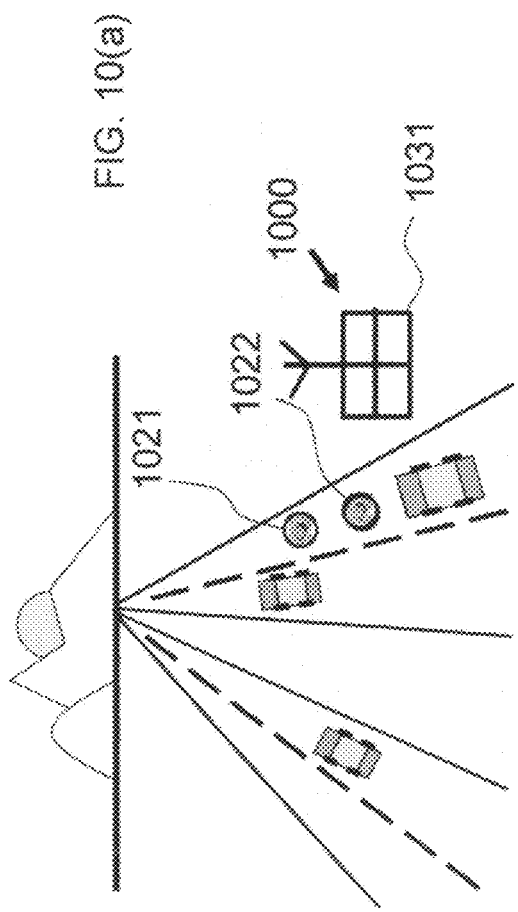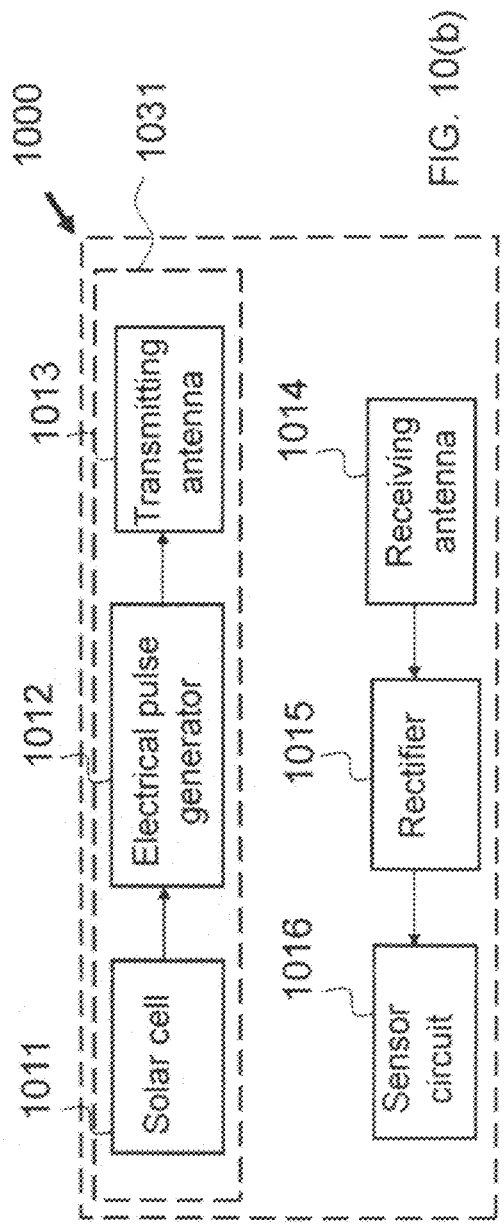

WIRELESS TRAFFIC SENSOR SYSTEM

CROSS REFERENCE TO RELATED APPLICATION

The present application claims the benefit of priority of a provisional patent application Ser. No. 61/455,995 entitled "WIRELESS TRAFFIC SENSOR SYSTEM", filed Oct. 28, 2010 with the United States Patent and Trademark Office, the content of which is incorporated herein by reference in its entirety.

FIELD OF THE INVENTION

The present invention relates to system and device for sensing and processing traffic and vehicle related information, and in particular relates to a wireless traffic sensor system.

BACKGROUND

We are standing on the brink of a new ubiquitous communication era, which may be referred to as "Internet-for-Everything". Over the last decade or so, internet related technologies have developed so fast and been adopted by the society so widely and popularly that, in a not so distant near future, it is at least Applicants' view that the internet will provide data connectivity at anytime, from anywhere, and for anything.

One of the applications of internet may be in an intelligent traffic management system. Vehicle detection is a fundamental element of a traffic management system. Whether the goal of the system is to improve traffic flow and efficiency, enhance safety for drivers and passengers, and/or plan for future development of traffic-related infrastructure, on-site real-time detection of traffic volume, speed, occupancy, vehicle length, presence, and headway, all as part of traffic and vehicle related information, are vital for both real-time traffic management and non-real-time statistical analysis of traffic.

So far, different varieties of sensors for vehicle detection have been developed and used, which may include, for example, inductive loops, video cameras, and radar detectors. However, these conventional technologies all have their respective limitations. More importantly, a most common limitation of these technologies is that they all require wired power supply to the sensors. Industrial researchers have recently started to pay attention to develop wireless traffic sensors for traffic management applications. The benefits of using wireless traffic sensors include flexibility, easy of installation, remote maintenance, low cost, low power and high accuracy.

SUMMARY

Embodiment of the present invention provides a wireless traffic sensor system. In one aspect, the system includes a plurality of wireless traffic sensors collecting traffic and vehicle related information from one or more vehicles that pass by the plurality of wireless traffic sensors; and at least one wireless communication device that receives the traffic and vehicle related information from at least one of the plurality of wireless traffic sensors and relays the traffic and vehicle related information to a wireless communication tower in vicinity.

In one embodiment, the wireless communication device is a cell phone carried inside one of the one or more vehicles. Furthermore, the cell phone may be powered up but not in use by a person riding in the vehicle.

In one embodiment, at least one of the plurality of wireless traffic sensors is placed inside a container and has a mounting flange that lays over edge of the container and is affixed to the container by one or more spring clips, wherein the container being installed in ground at a location of a road where the one or more vehicles pass.

In one embodiment, the one or more spring clips are not physically accessible to a person once the wireless traffic sensor is affixed to the container, the one or more spring clips are released only upon receiving a coded wireless electromagnetic signal or by a tool that is made to match a key inside the wireless traffic sensor, to disengage the wireless traffic sensor from the container.

According to another embodiment, the wireless traffic sensor system further includes a battery charging unit in vicinity of the plurality of wireless traffic sensors, wherein the battery charging unit converts solar power into electrical pulses and transmits the electrical pulses to the plurality of wireless traffic sensors; and wherein the plurality of wireless traffic sensors convert the electrical pulses into DC power, and use the DC power to charge a rechargeable battery used by the plurality of wireless traffic sensors.

Moreover, the plurality of wireless traffic sensors includes a first wireless traffic sensor (WTS) and a second WTS being separated from each other by a distance D along a vehicle passing path. In one embodiment, the first WTS gives a first estimated speed of a first vehicle passing the first WTS along the path at a first time, and the second WTS gives a second estimated speed of a second vehicle passing the second WTS along the path at a second time. The wireless traffic sensor system further includes a data processing unit that determines whether the second vehicle and the first vehicle are a same vehicle based upon the first estimated speed at the first time, the second estimated speed at the second time, and the distance D between the first and second wireless traffic sensors.

In determining whether the first and second vehicles are the same vehicle, in one embodiment, the data processing unit determines that the second vehicle is the first vehicle when a third estimated speed, calculated by dividing the distance D by a time duration from the first time to the second time, is within a pre-determined range of the first speed or the second speed.

BRIEF DESCRIPTION OF THE DRAWINGS

The present invention will be understood and appreciated more fully from the following detailed description of embodiments of the invention, taken in conjunction with accompanying drawings of which:

FIG. 6 is a simplified illustration of a method of mounting wireless traffic sensors as is known in the art;

FIG. 7 is a simplified illustration of another method of mounting wireless traffic sensors as is known in the art;

FIGS. 10(a) and 10(b) are demonstrative illustrations of a wireless battery charging system according to one embodiment of the present invention.

DETAILED DESCRIPTION OF PREFERRED EMBODIMENTS

In the following detailed description, numerous specific details are set forth in order to provide a thorough understanding of embodiments of the present invention. However, it will be understood by those of ordinary skill in the art that embodiments of the invention may be practiced without these specific details. In other instances, well-known methods and procedures have not been described in detail so as not to obscure embodiments of the invention.

In the following description, various figures, diagrams, flowcharts, models, and descriptions are presented as different means to effectively convey the substances and illustrate different embodiments of the invention that are proposed in this application. It shall be understood by those skilled in the art that they are provided merely as exemplary samples, and shall not be constructed as limitation to the invention.

Figures 1, 2:
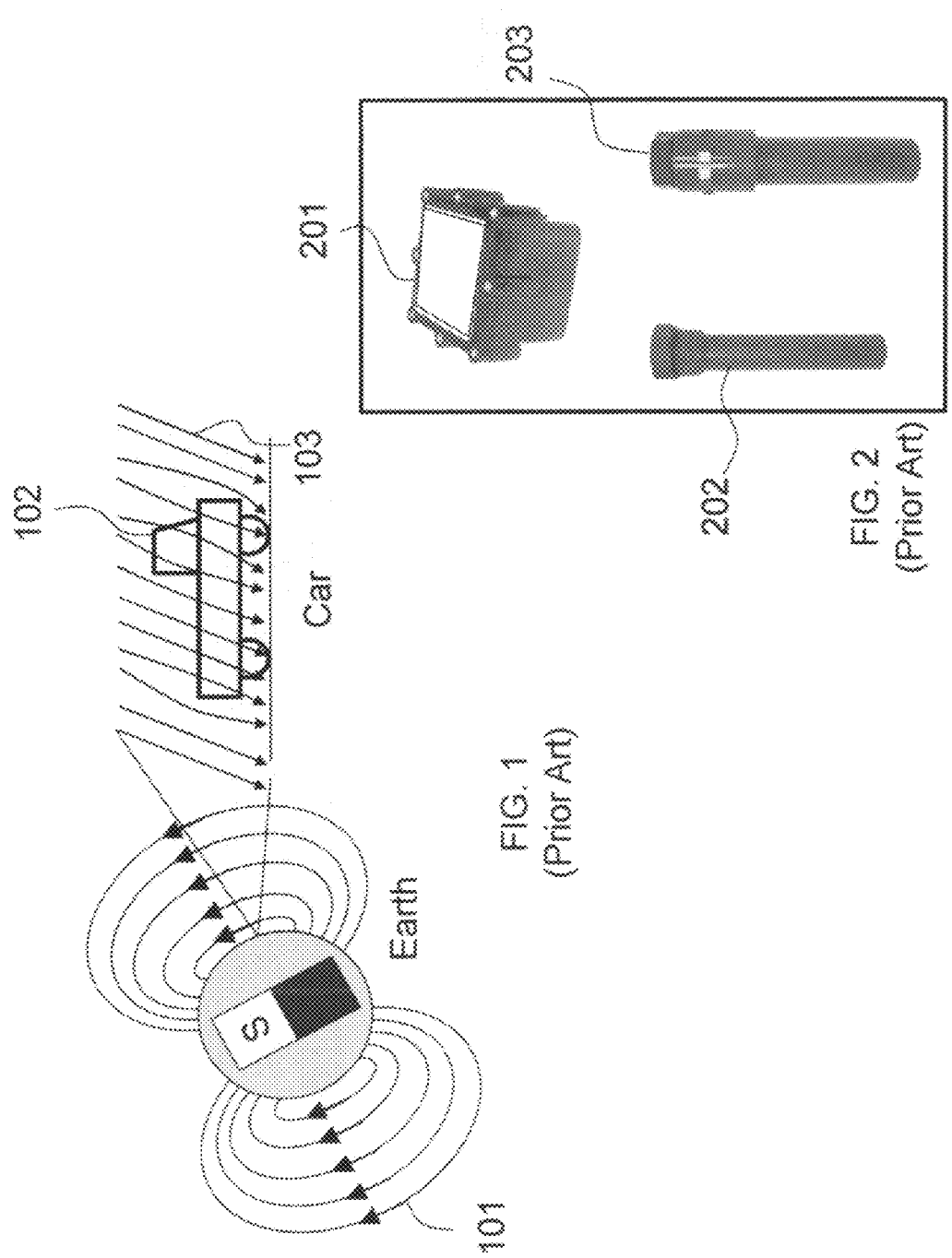
FIG. 1 is a simplified illustration of change in direction of the earth magnetic field caused by a passenger car or a moving vehicle as is known in the art.
FIG. 2 is a simplified illustration of some wireless traffic sensors known in the art.

FIG. 1 is a simplified illustration of change in direction of the earth magnetic field caused by a passenger car or a moving vehicle as is known in the art. For example, when a moving object such as a passenger car 102 passes by a location 103, earth magnetic field 101 at location 103 may be disturbed or bended by the metal parts or body of the moving vehicle or moving object, causing its direction to change. Details in the change of direction of the magnetic field, such as location, extent of change, and duration, may carry "signature" of the moving vehicle that caused such changes, and therefore may be used to extract information such as, for example, speed, moving direction, occupancy, length, etc. that are specifically related to this particular passing vehicle. Furthermore, a collection of information of collective one or more vehicles may be used as general traffic information. The change in direction of earth magnetic field may be detected by applying one or more wireless traffic sensors.

FIG. 2 is a simplified illustration of some wireless traffic sensors that are known in the art. A wireless traffic sensor (WTS) is normally known as a small electronic device that may be installed or buried at or under the surface of a road, where vehicles or traffic pass by, for counting the vehicles and determining their classification, speed, and other related information by sensing and/or detecting earth magnetic field changes, as being illustrated in FIG. 1, caused by the presence and/or movement of the vehicles being detected and/or monitored. WTS 201, 202, and 203 are some of the wireless traffic sensors currently available in the market.

Figure 4:
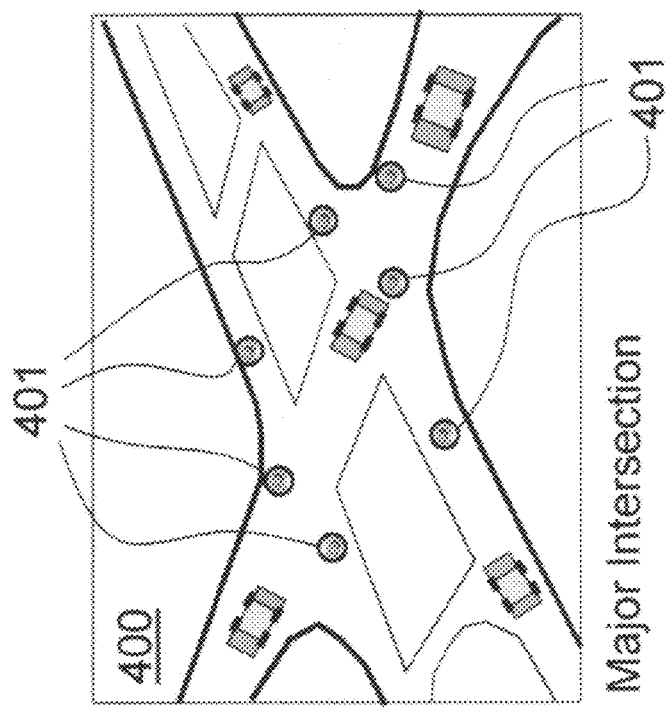
FIG. 4 is a demonstrative illustration of several wireless traffic sensors being installed strategically around a major inter-section in a metropolitan area.
Figure 3:
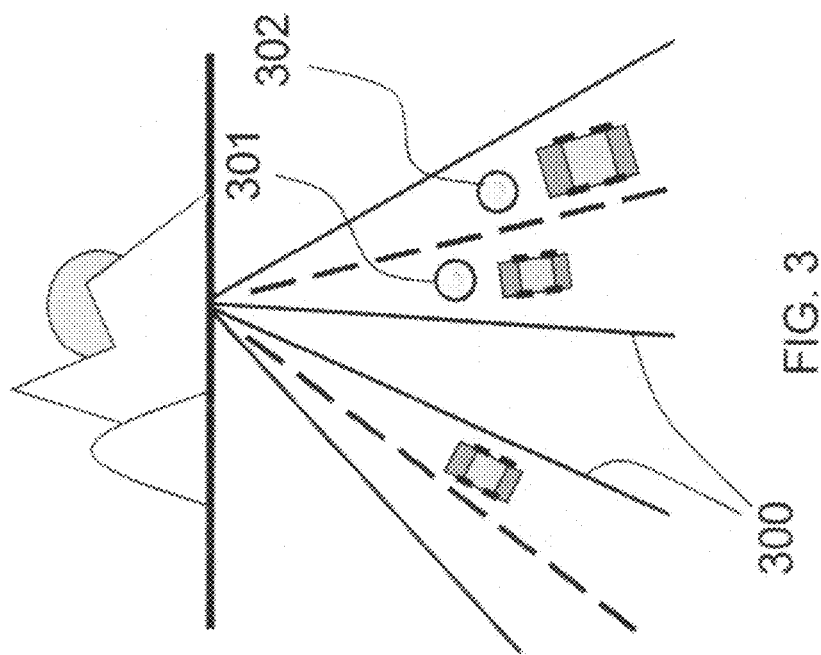
FIG. 3 is a demonstrative illustration of two wireless traffic sensors being installed in different lanes along a major inter-state route.

FIG. 3 is a demonstrative illustration of two wireless traffic sensors 301 and 302 that may be installed or mounted in different traffic lanes along, for example, a major inter-state route 300, under the road surface for traffic flow detection and monitoring. Each wireless traffic sensor may individually detect traffic or vehicles passing that particular lane. FIG. 4 is a demonstrative illustration of several wireless traffic sensors, collectively being referenced to here as WTS 401, that may be strategically installed or mounted around a major inter-section 400 in a metropolitan area for monitoring traffic congestion in that location. Like in FIG. 3, each wireless traffic sensor may individually detect traffic or vehicles coming or passing a particular direction of the inter-section.

Figure 5:
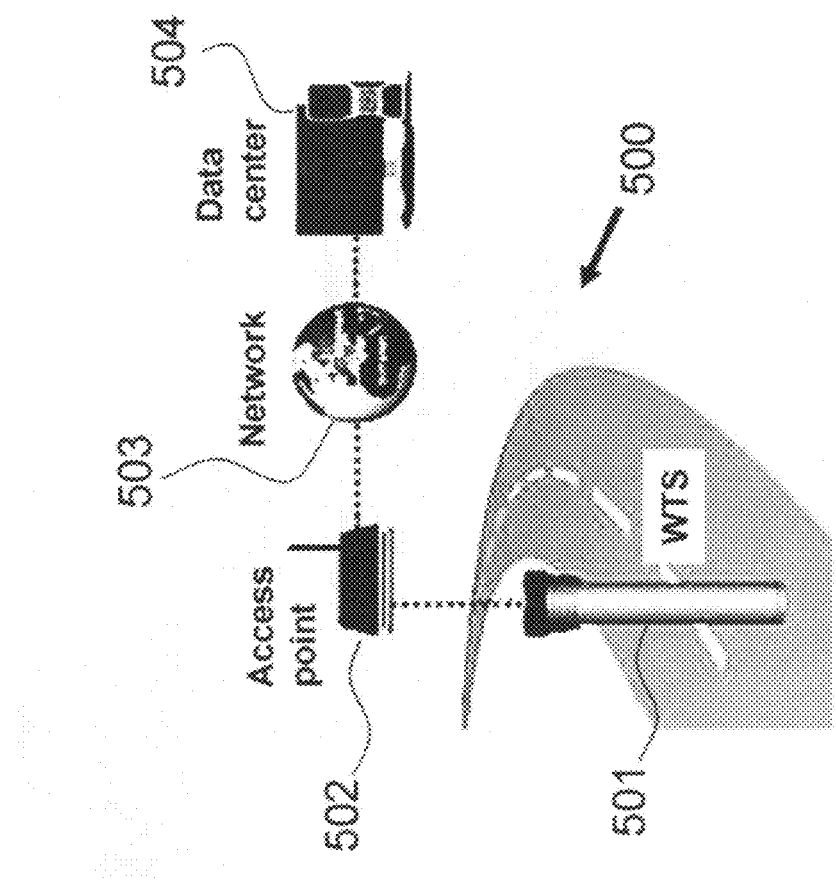
FIG. 5 is a demonstrative illustration of a wireless traffic sensor system according to one embodiment of the present invention.

FIG. 5 is a demonstrative illustration of a wireless traffic sensor system according to one embodiment of the present invention. More particular, system 500 may include multiple wireless traffic sensors (WTS) 501; one or more wireless access points 502 receiving traffic related data or information from WTS 501; a data transmission network 503 such as, for example, a virtual private network (VPN) or a communication network built on the backbone of interne; and a traffic data analysis and control center 504 that may include one or more data processing units. Embodiments of the present invention are described below in more details with regard to different aspects of wireless traffic sensor system 500.

FIG. 6 is a simplified illustration of a method of mounting and/or installing wireless traffic sensors as is known in the art. In this direct mounting scheme, a hole of suitable size is first drilled at a desired location or section of a road. A wireless sensor 601 is then placed inside the hole and fixed and sealed to the hole with a fast epoxy. FIG. 7 is a simplified illustration of another method of mounting and/or installing wireless traffic sensors as is known in the art. In this indirect mounting scheme, a wireless sensor 701 is installed inside a container 702. First, a hole of suitable size for the container 702 is drilled at a desired location or section of a road. The container 702 is then placed inside the hole and fixed and sealed to the hole through a fast epoxy or concrete. After the container 702 is installed, the wireless sensor 701 may be screwed into the container 702.

However, with the direct mounting scheme shown in FIG. 6, it is generally very difficult to remove the wireless traffic sensor for the purpose of, for example, battery replacement or certain repair work should such repair needs arise in future because the wireless traffic sensor is "semi-permanently" fixed to the hole in the ground. In other words, the wireless traffic sensor may need to be "dug" out of the ground for the above purpose risking the potential of being damaged during the "dug-out" process. On the other hand, the indirect mounting scheme shown in FIG. 7 may enable removing the sensor through unscrewing it from the container so that battery of the sensor may be served. However, it is vulnerable to undesired removal of the sensor by un-authorized personnel.

According to one embodiment of the present invention, an auto-locking mounting scheme may be used to securely install a wireless traffic sensor. The wireless traffic sensor is installed through a container but the container includes a locking mechanism such as one or more spring clips which may only be opened through a special tool or an electronic unlocking code received by the container. The mounting scheme prevents the sensor being taken-out undesirably.

Figure 8:
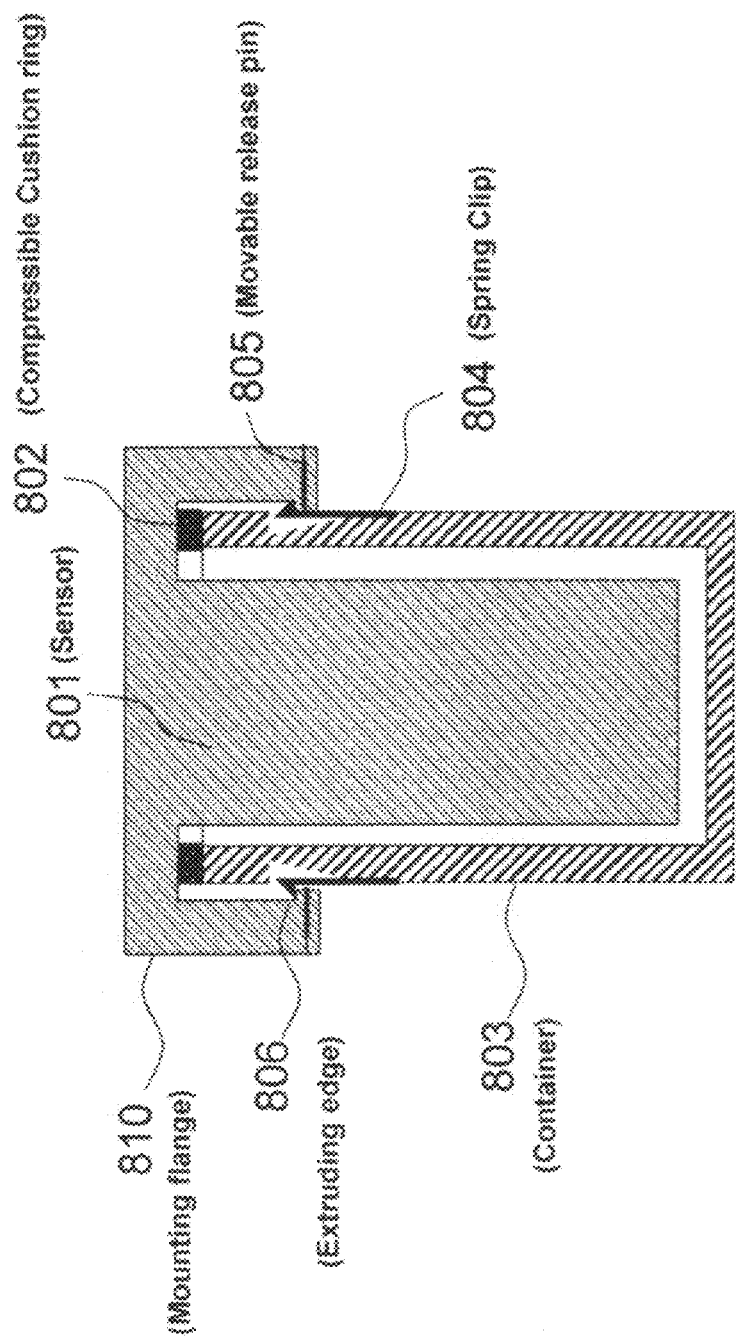
FIG. 8 is a demonstratively illustration of a wireless traffic sensor being installed in a container according to one embodiment of the present invention.

FIG. 8 is a demonstratively illustration of a wireless traffic sensor being installed in a container according to one embodiment of the present invention. More specifically, wireless traffic sensor 801 may be placed inside a container 803 and be fastened or affixed to container 803 which is permanently installed in ground at a desired location of a road or wherever such a wireless traffic sensor is desired to be installed. A compressible cushion ring 802 may be placed between sensor 801 and container 803 for additional protection and/or cushion.

According to one embodiment of the present invention, wireless traffic sensor 801 may have a mounting flange 810 which contains a specially designed extruding edge 806 directing inwardly as being illustratively shown in FIG. 8. At the outside walls of container 803 there may be one or more spring clips 804. Wireless traffic sensor 801 may be placed inside container 803 with mounting flange 810 being laid over the edge of container 803. With compressible cushion ring 802 being in-between, mounting flange 810 of wireless traffic sensor 801 is fastened or affixed to container 803 by engaging the extruding edge 806 at the mounting flange 810 of wireless traffic sensor 801 with the one or more spring clips 804 of container 803. The spring clips 804 are not accessible once wireless traffic sensor 801 is fastened or affixed to container 803.

To remove or disengage wireless traffic sensor 801 from container 803, a special tool tailored for accessing release one or more movable release pins 805 is required. In one embodiment, the special tool may be made to match a key of sensor 801 such that it may be used to push removable release pins 805 inward against spring clips 804, causing spring clips 804 to be disengaged with the extruding edge 806 along the mounting flange 810 of wireless traffic sensor 801. Spring clips 804 may be made with any suitable materials, metal or plastic, to have any suitable locking mechanism or feature that may engage or disengage with the extruding edge 806 of wireless traffic sensor 801.

While engagement of spring clips 804 with extruding edge 806 of sensor 801 may be made automatic when wireless traffic sensor 801 is being pushed down into container 803, according to another embodiment of the present invention, disengagement of spring clips 804 with extruding edge 806 or release of spring clips 804 from extruding edge 806 may be made through sending a specially coded electromagnetic signal to wireless traffic sensor 801 either via its external electric contacts or wirelessly. For example, a coded wireless electromagnetic signal may be transmitted to and received by wireless traffic sensor 801 to cause movable release pins 805 to push inward toward spring clips 804, thereby disengaging wireless traffic sensor 801 from container 803.

Figures 9A, 9B:
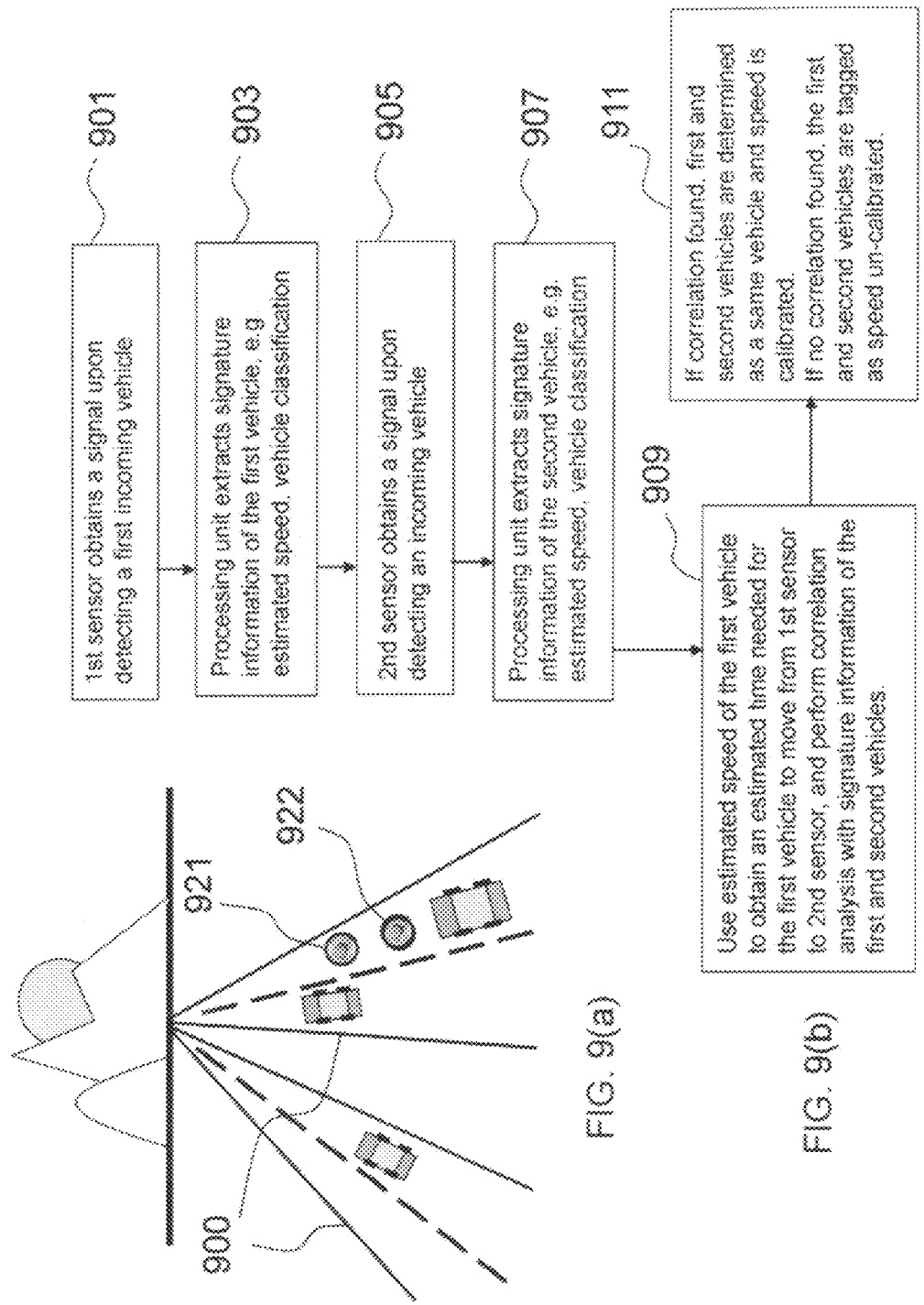
FIGS. 9(a) and 9(b) are demonstrative illustrations of a method of calibrating speed of a moving object according to one embodiment of the present invention.

FIGS. 9(*a*) and 9(*b*) are demonstrative illustrations of a method of calibrating speed of a moving object or vehicle according to one embodiment of the present invention. For example, the method may include installing at least two wireless traffic sensors 921 and 922, as being illustrated in FIG. 9(*a*), in a same lane of traffic approximately along a direction of expected traffic flow of a traffic route 900. The two sensors 921 and 922 may be separated by a distance D which may be between about 10 meters and about 50 meters, for example. However, embodiment of the present invention is not limited in this respect and the distance separating the two sensors 921 and 922 may be determined by such factors as the expected speed of the moving vehicle in this particular section of the road, and/or the power and capacity of a data processing center or data processing unit that will be processing collected information by such sensors. The distance needs to be carefully designed and/or calibrated since a shorter distance may not provide sufficient time for vehicle specific information being processed by the sensing wireless traffic sensor while a longer distance may cause error and/or confusion because more than one vehicle may be able to travel between the two adjacent wireless traffic sensors.

According to one embodiment of the present invention, first sensor 921 may obtain a signal upon detecting a first incoming object such as a first moving vehicle as being illustrated in step 901. A data processor or data processing unit, which may be embedded inside first sensor 921 or remotely and wirelessly connected to first sensor 921 from a central processing office through a communication network, may extract signature information that is particularly relevant to this first vehicle, as being illustrated in step 903. Such signature information may include, for example, a first estimated speed of the first vehicle at a first time, and classification of the first vehicle, to name a few.

Next, as being illustrated in step 905, second sensor 922 may obtain a signal upon detecting a second incoming object such as a second moving vehicle, which may be a same or a different vehicle as that being detected by first sensor 921. Following step 905, a data processor or data processing unit associated with second sensor 922 may extract signature information that is particularly relevant to this second vehicle as being illustrated in step 907. Such signature information may include, similar to the first vehicle, a second estimated speed of the second vehicle at a second time, and classification of the second vehicle.

Based upon the first estimated speed of the first vehicle or the second estimated speed of the second vehicle, and based upon the distance D between the two sensors, one embodiment of the present invention includes obtaining an estimated time "T1" for the first vehicle detected by the first sensor to move from first sensor 921 to second sensor 922, or an estimated time "T2" for the second vehicle detected by the second sensor to move from first sensor 921 to second sensor 922. The method then performs a correlation analysis comparing T1 and/or T2 with a time duration or time window measured from the first time recorded by the first sensor to the second time recorded by the second sensor, and decided or determines whether T1 and/or T2 is with a pre-determined range of the time window such as, for example, from 70% to 130% of the time window, as being illustrated in step 909.

Alternatively, according to another embodiment of present invention, an estimated speed may be calculated based upon distance D separating the first and second sensors and a time duration or time window between the first time recorded by the first sensor and the second time recorded by the second sensor. The method then performs a correlation between the above estimated speed through dividing distance D by the time duration, and the first estimated speed by the first sensor and/or the second estimated speed by the second sensor. For example, the method determines whether the first estimated speed and/or the second estimated speed is within a pre-determined range, such as 70% to 130%, of the above calculated speed.

If correlation as being described above between the two sets of signature information is found, with a reasonable accuracy, then it is determined that the second vehicle is a same vehicle as the first vehicle or the two vehicles are a same vehicle. Furthermore, the actual time for the first vehicle (or the second vehicle) to move from first sensor 921 to second sensor 922 (which is readily available from the first time and the second time recorded by the two sensors) is used to calibrate the speed of the vehicle, as being illustrated in step 911. If no correlation is found, then the first and second estimated speeds may be used for the first and second vehicles with a tag being attached to the respective vehicles indicating that speed calibration was not performed, or was not performed due to certain reasons, for the vehicles.

FIGS. 10(*a*) and 10(*b*) are demonstrative illustrations of a wireless battery charging unit or system according to one embodiment of the present invention. More specifically, wireless battery charging unit 1000 may include a charging unit 1031, powered by solar energy, to include a solar cell 1011. The charging unit may be installed outside the traffic flow route such as at or near curbside of the road. Charging unit 1031 may convert solar power or energy from solar cell 1011 into electrical pulses 1012 through a pulse generator, and subsequently transmits electrical pulses 1012 to nearby wireless traffic sensors such as, for example, sensors 1021, 1022, through a transmitting antenna 1013. On the other hand, wireless traffic sensors 1021 and 1022 may receive electrical pulses 1012 through a receiving antenna 1014, convert the pulses through a rectifier 1015 into DC (direct current) power to charge one or more rechargeable batteries that are used in a sensor circuit 1016 to provide power supply to wireless sensors 1021 and 1022.

Figure 11B:
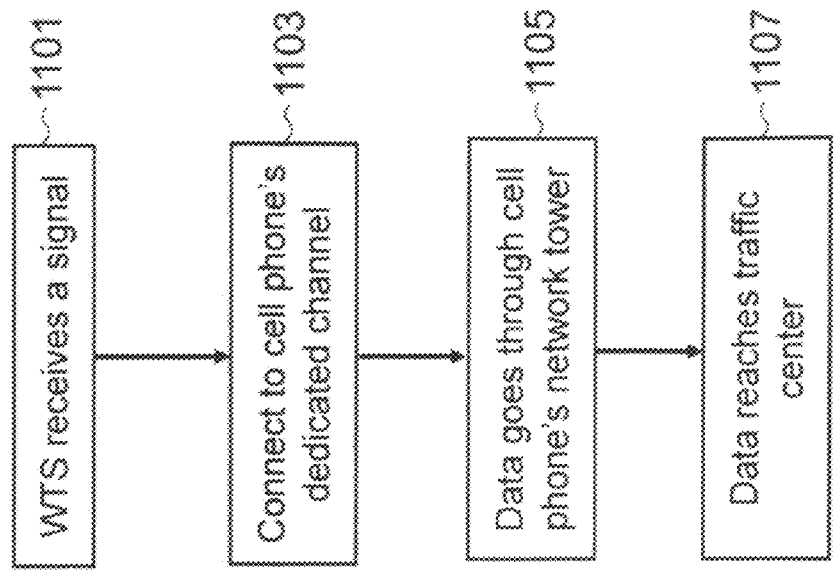
FIGS. 11(a) and 11(b) are demonstrative illustrations of a traffic data relay system in a wireless traffic sensor system according to one embodiment of the present invention.
Figure 11A:
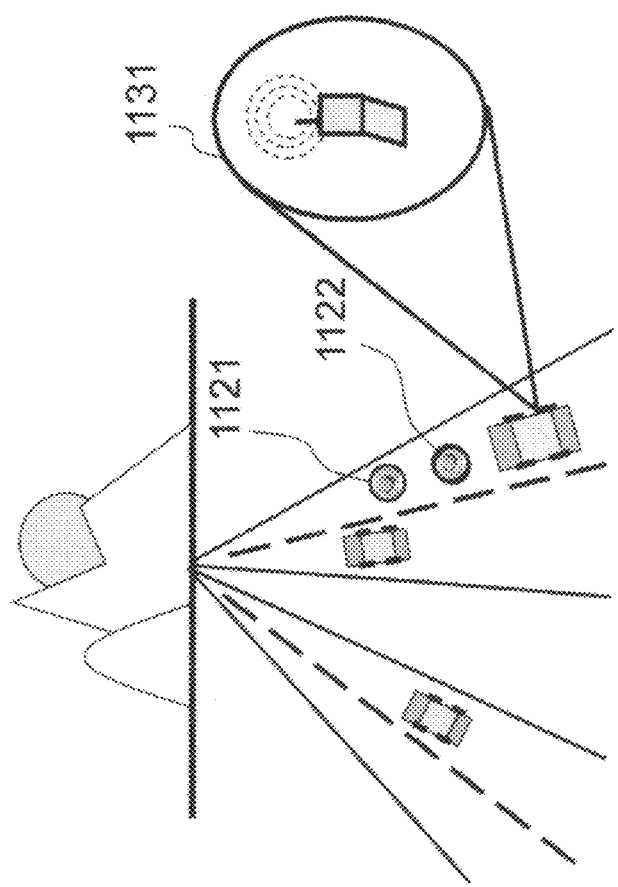

FIGS. 11(*a*) and 11(*b*) are demonstrative illustrations of a traffic information relay system in a wireless traffic sensor system according to one embodiment of the present invention. For example, in one embodiment, wireless traffic sensors 1121 and 1122 may send traffic and vehicle related information or data to a nearby communication device which is preferably a mobile communication device. In one embodiment, the mobile communication device may be a nearby cell phone such as, for example, a cell phone 1131 carried in one of the one or more vehicles that pass by wireless traffic sensor 1122. According to one embodiment, cell phone 1131 may have a dedicated channel or include an operating unit which broadcasts a weak signal with coverage of less than, for example, 100 meters. The dedicated channel may be in operation as long as the cell phone is powered up and has established a communication link with a nearby wireless communication tower, regardless whether the cell phone is in active use or not by a person in the vehicle. In another embodiment, the operating unit inside the cell phone may constantly broadcast a weak signal for the traffic and vehicle related information.

More specifically, during operation, at least one of wireless traffic sensor (WTS) 1121 and WTS 1122, for example WTS 1121, may receive and/or detect signals of one or more incoming vehicles at step 1101. Subsequently, WTS 1121 may send a request to a cell phone 1131, which happens to be in the vicinity of WTS 1121, for relaying that traffic and vehicle related signals and/or information. When a communication link between WTS 1121 and cell phone 1131 is established, WTS 1121 is connected to the dedicated channel of cell phone 1131. The WTS traffic data and information, which may also include ID information of WTS 1121 and other location related information, are then collected by cell phone 1131 at step 1103. Cell phone 1131 then relays the data and information to one of nearby wireless communication towers of the cellular network at step 1105. The data and information finally reach the traffic center at step 1107 through the cellular network. The data collection action performed by the cell phone may be controlled by traffic control center or cellular operators according to the cell phone location.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A wireless traffic sensor system comprising:
a plurality of wireless traffic sensors collecting traffic and vehicle related information from one or more vehicles that pass by said plurality of wireless traffic sensors; and
at least one wireless communication device that receives said traffic and vehicle related information from at least one of said plurality of wireless traffic sensors and relays said traffic and vehicle related information to a wireless communication tower in vicinity, wherein said plurality of wireless traffic sensors include a first wireless traffic sensor (WTS) and a second WTS being separated from each other by a distance D along a vehicle passing path; said first WTS giving a first estimated speed of a first vehicle passing said first WTS along said path at a first time; said second WTS giving a second estimated speed of a second vehicle passing said second WTS along said path at a second time, the wireless traffic sensor system further comprises a data processing unit that determines whether said second vehicle and said first vehicle are a same vehicle based upon said first estimated speed at said first time; said second estimated speed at said second time; and said distance D between said first and said second WTSs.

2. The wireless traffic sensor system of claim 1, wherein said wireless communication device is a cell phone carried inside one of said one or more vehicles.

3. The wireless traffic sensor system of claim 2, wherein said cell phone is powered up but not in use by a person riding in said one of said one or more vehicles.

4. The wireless traffic sensor system of claim 1, wherein at least one of said plurality of wireless traffic sensors is placed inside a container; having a mounting flange that lays over edge of said container; and being affixed to said container by one or more spring clips, wherein said container being installed in ground at a location of a road where said one or more vehicles pass.

5. The wireless traffic sensor system of claim 4, wherein said one or more spring clips are not physically accessible to a person once said wireless traffic sensor is affixed to said container, said one or more spring clips are released to disengage said wireless traffic sensor from said container only upon receiving a coded wireless electromagnetic signal or by a tool that is made to match a key inside said wireless traffic sensor.

6. The wireless traffic sensor system of claim 1, further comprising a battery charging unit in vicinity of said plurality of wireless traffic sensors, wherein said battery charging unit converts solar power into electrical pulses and transmits said electrical pulses to said plurality of wireless traffic sensors; and wherein said plurality of wireless traffic sensors convert said electrical pulses into DC power to charge a rechargeable battery used in said plurality of wireless traffic sensors.

7. The wireless traffic sensor system of claim 1, wherein said data processing unit determines that said second vehicle is a same vehicle as said first vehicle when a third estimated speed, calculated by dividing said distance D by a time duration from said first time to said second time, is within a pre-determined range of said first estimated speed or said second estimated speed.

8. A wireless traffic sensor system comprising:
a first wireless traffic sensor (WTS) and a second WTS being installed in ground along a vehicle passing path and separated by a pre-determined distance; and
a data processing unit,
wherein said data processing unit receives a first speed of a first vehicle estimated by said first WTS at a first time when said first vehicle passes by said first WTS; receives a second speed of a second vehicle estimated by said second WTS at a second time when said second vehicle passes by said second WTS; and determines whether said second vehicle and said first vehicle are a same vehicle based upon said first estimated speed at said first time, said second estimated speed at said second time, and said pre-determined distance between said first and said second WTSs.

9. The wireless traffic sensor system of claim 8, wherein determining whether said second vehicle and said first vehicle are a same vehicle comprises calculating a third speed by dividing said pre-determined distance by a time duration between said second time and said first time, and determining said second vehicle is a same vehicle as said first vehicle when said first speed or said second speed is within a pre-determined range of said third speed.

10. The wireless traffic sensor system of claim 8, wherein at least one of said first and second wireless traffic sensors is placed inside a container; having a mounting flange that lays over edge of said container; and being fastened to said container by one or more spring clips.

11. The wireless traffic sensor system of claim 10, wherein said one or more spring clips are not physically accessible once said wireless traffic sensor is fastened to said container, said one or more spring clips are released only upon receiving a coded wireless electromagnetic signal or by a tool that is made to match a key inside said wireless traffic sensor, to disengage said wireless traffic sensor from said container.

12. The wireless traffic sensor system of claim 8, further comprising a battery charging unit in vicinity of said first and second wireless traffic sensors, wherein said battery charging unit converts solar power into electrical pulses and transmits said electrical pulses to said first and second wireless traffic sensors; and wherein said first and second wireless traffic sensors applies energy of said electrical pulses in charging a rechargeable battery used by said first and second wireless traffic sensors.

13. The wireless traffic sensor system of claim 8, further comprising a wireless communication device, said wireless communication device receives traffic and vehicle related information from at least one of said first and said second wireless traffic sensors and relays said traffic and vehicle related information to a wireless communication tower in vicinity.

14. The wireless traffic sensor system of claim 8, wherein traffic and vehicle related information collected by said first and second wireless traffic sensors is caused to be relayed to a wireless communication tower through a cell phones carried by one or more vehicles passing by said first and second wireless traffic sensors.

* * * * *